(12) United States Patent
Uchida

(10) Patent No.: US 10,239,354 B2
(45) Date of Patent: *Mar. 26, 2019

(54) PNEUMATIC TIRE

(71) Applicant: The Yokohama Rubber Co., LTD., Minato-ku, Tokyo (JP)

(72) Inventor: Yuta Uchida, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 146 days.

This patent is subject to a terminal disclaimer.

(21) Appl. No.: 15/028,251

(22) PCT Filed: Sep. 24, 2014

(86) PCT No.: PCT/JP2014/075267
§ 371 (c)(1),
(2) Date: Apr. 8, 2016

(87) PCT Pub. No.: WO2015/064248
PCT Pub. Date: May 7, 2015

(65) Prior Publication Data
US 2016/0280011 A1    Sep. 29, 2016

(30) Foreign Application Priority Data

Oct. 30, 2013  (JP) .................................. 2013-225365

(51) Int. Cl.
*B60C 11/04* (2006.01)
*B60C 11/00* (2006.01)
(Continued)

(52) U.S. Cl.
CPC ...... *B60C 11/0304* (2013.01); *B60C 11/0083* (2013.01); *B60C 11/0302* (2013.01);
(Continued)

(58) Field of Classification Search
CPC ............ B60C 11/1376; B60C 11/1384; B60C 11/1392

See application file for complete search history.

(56) References Cited

U.S. PATENT DOCUMENTS

| 4,840,210 A | 6/1989 | Kukimoto |
| 2011/0079334 A1* | 4/2011 | Bott .................... B60C 11/0302 152/209.14 |

(Continued)

FOREIGN PATENT DOCUMENTS

| EP | 2067636 A1 * | 6/2009 | ............. B60C 11/00 |
| JP | S63-041204 | 2/1988 | |

(Continued)

OTHER PUBLICATIONS

Machine Translation: EP-2067636-A1; Siemers Arne; (Year: 2018).*

(Continued)

*Primary Examiner* — Kendra Ly
(74) *Attorney, Agent, or Firm* — Thorpe North & Western

(57) ABSTRACT

The pneumatic tire (1) comprises at least three circumferential grooves (22) extending in a tire circumferential direction in a tread portion (2), and at least four ribs (23) defined by the circumferential grooves (22), the at least four ribs (23) extending in the tire circumferential direction. At least two of the ribs (23) protrude outward in a tire radial direction beyond the profile line (L) of the tread surface when viewed in the meridian cross section. The protruding amount (G) of the at least two ribs (23) decreases in order from a first side in a tire width direction to a second side.

9 Claims, 9 Drawing Sheets

(51) Int. Cl.
 B60C 11/03 (2006.01)
 B60C 11/13 (2006.01)
(52) U.S. Cl.
 CPC ...... B60C 11/0332 (2013.01); B60C 11/1376 (2013.01); B60C 2011/0341 (2013.01); B60C 2011/0386 (2013.01)

(56) References Cited

U.S. PATENT DOCUMENTS

| | | |
|---|---|---|
| 2013/0240101 A1 | 9/2013 | Kameda |
| 2014/0166169 A1* | 6/2014 | Tanaka ................ B60C 11/1376 152/209.15 |
| 2016/0009142 A1* | 1/2016 | Tada ................... B60C 11/1376 152/209.15 |

FOREIGN PATENT DOCUMENTS

| | | | |
|---|---|---|---|
| JP | 2002-029216 | 1/2002 | |
| JP | 2004-122904 | 4/2004 | |
| JP | 2007331439 A * | 12/2007 | ......... B60C 11/0083 |
| JP | 2009-083524 | 4/2009 | |
| JP | 2009-269421 | 11/2009 | |
| JP | 2013-189121 | 9/2013 | |

OTHER PUBLICATIONS

Machine Translation: JP-2007331439-A; Kamitoku, Koichi; (Year: 2018).*
International Search Report for International Application No. PCT/JP2014/075267 dated Jan. 6, 2015, 4 pages, Japan.

* cited by examiner

| | | Conventional Example 1 | Comparative Example 1 | Working Example 1 | Working Example 2 | Working Example 3 | Working Example 4 | Working Example 5 | Working Example 6 | Working Example 7 |
|---|---|---|---|---|---|---|---|---|---|---|
| Rib Configuration (applicable drawing) | | FIG. 1 | FIG. 1 | FIG. 1 | FIG. 1 | FIG. 1 | FIG. 1 | FIG. 1 | FIG. 1 | FIG. 1 |
| First side outer rib | Protruding | - | - | - | - | - | - | Protruding | - | Protruding |
| | Protruding amount [mm] | - | - | - | - | - | - | 2.0 | - | 3.0 |
| First side inner rib | Protruding | - | - | Protruding | - | Protruding | - | Protruding | Protruding | Protruding |
| | Protruding amount [mm] | - | - | 1.0 | - | 2.0 | - | 1.0 | 2.5 | 2.5 |
| Tire equatorial plane rib | Protruding | - | Protruding | Protruding | Protruding | Protruding | Protruding | Protruding | Protruding | Protruding |
| | Protruding amount [mm] | - | 0.04 | 0.04 | 0.04 | 0.04 | 2.0 | 0.04 | 2.0 | 2.0 |
| Second side inner rib | Protruding | - | - | - | Protruding | Protruding | Protruding | - | - | Protruding |
| | Protruding amount [mm] | - | - | - | 1.0 | 1.0 | 1.0 | - | 1.0 | 1.0 |
| Second side outer rib | Protruding | - | - | - | - | - | Protruding | - | Protruding | Protruding |
| | Protruding amount [mm] | - | - | - | - | - | 0.04 | - | 0.04 | 0.04 |
| Steering stability at high speeds | | 100 | 100 | 102 | 101 | 103 | 102 | 103 | 104 | 105 |
| Durability at high speeds when a camber is applied | | Baseline | Same as baseline | +0.25 | Same as baseline | +0.5 | +0.25 | +0.5 | +0.75 | +1.0 |

FIG. 6A

| | Working Example 8 | Working Example 9 | Working Example 10 | Working Example 11 | Working Example 12 | Working Example 13 | Working Example 14 | Working Example 15 |
|---|---|---|---|---|---|---|---|---|
| Rib Configuration (applicable drawing) | FIG. 1 | FIG. 1 | FIG. 1 | FIG. 1 | FIG. 1 | FIG. 1 | FIG. 1 | FIG. 1 |
| First side outer rib — Protruding | Protruding | - | - | - | - | - | - | - |
| First side outer rib — Protruding amount [mm] | 2.0 | - | - | - | - | - | - | - |
| First side inner rib — Protruding | Protruding | Protruding | Protruding | Protruding | Protruding | Protruding | Protruding | Protruding |
| First side inner rib — Protruding amount [mm] | 1.5 | 2.1 | 2.0 | 0.6 | 1.25 | 1.1 | 1.8 | 0.6 |
| Tire equatorial plane rib — Protruding | Protruding | Protruding | Protruding | Protruding | Protruding | Protruding | Protruding | Protruding |
| Tire equatorial plane rib — Protruding amount [mm] | 1.0 | 1.0 | 0.05 | 0.2 | 1.2 | 1.0 | 1.0 | 0.4 |
| Second side inner rib — Protruding | Protruding | - | - | - | Protruding | Protruding | Protruding | Protruding |
| Second side inner rib — Protruding amount [mm] | 0.5 | - | - | - | 0.2 | 0.9 | 0.2 | 0.2 |
| Second side outer rib — Protruding | Protruding | - | - | - | - | - | - | - |
| Second side outer rib — Protruding amount [mm] | 0.05 | - | - | - | - | - | - | - |
| Steering stability at high speeds | 108 | 103 | 104 | 105 | 104 | 106 | 107 | 105 |
| Durability at high speeds when a camber is applied | +2.0 | +0.75 | +0.75 | +1.0 | +0.75 | +2.0 | +1.5 | +1.5 |

FIG. 6B

| | | Conventional Example 2 | Comparative Example 2 | Working Example 16 | Working Example 17 | Working Example 18 | Working Example 19 | Working Example 20 |
|---|---|---|---|---|---|---|---|---|
| Rib Configuration (applicable drawing) | | FIG. 2 | FIG. 2 | FIG. 2 | FIG. 2 | FIG. 2 | FIG. 2 | FIG. 2 |
| First side outer rib | Protruding | - | - | - | - | Protruding | Protruding | - |
| | Protruding amount [mm] | - | - | - | - | 1.0 | 2.0 | - |
| First side inner rib | Protruding | - | Protruding | Protruding | - | Protruding | Protruding | Protruding |
| | Protruding amount [mm] | - | 0.04 | 1.0 | - | 0.04 | 1.0 | 2.0 |
| Second side inner rib | Protruding | - | - | Protruding | Protruding | - | Protruding | Protruding |
| | Protruding amount [mm] | - | - | 0.04 | 1.0 | - | 0.04 | 1.0 |
| Second side outer rib | Protruding | - | - | - | Protruding | - | - | Protruding |
| | Protruding amount [mm] | - | - | - | 0.04 | - | - | 0.04 |
| Steering stability at high speeds | | 100 | 100 | 102 | 101 | 103 | 104 | 103 |
| Durability at high speeds when a camber is applied | | Baseline | Same as baseline | +0.25 | Same as baseline | +0.5 | +0.75 | +0.5 |

FIG. 7A

| | | Working Example 21 | Working Example 22 | Working Example 23 | Working Example 24 | Working Example 25 | Working Example 26 | Working Example 27 |
|---|---|---|---|---|---|---|---|---|
| Rib Configuration (applicable drawing) | | FIG. 2 | FIG. 2 | FIG. 2 | FIG. 2 | FIG. 2 | FIG. 2 | FIG. 2 |
| First side outer rib | Protruding | Protruding | Protruding | - | - | - | - | - |
| | Protruding amount [mm] | 2.5 | 2.0 | - | - | - | - | - |
| First side inner rib | Protruding | Protruding | Protruding | Protruding | Protruding | - | Protruding | Protruding |
| | Protruding amount [mm] | 2.0 | 1.5 | 2.1 | 2.0 | 1.1 | 1.8 | 0.6 |
| Second side inner rib | Protruding | Protruding | Protruding | - | 0.05 | 1.0 | 1.0 | 0.2 |
| | Protruding amount [mm] | 1.0 | 1.0 | 1.0 | 0.05 | 1.0 | 1.0 | 0.2 |
| Second side outer rib | Protruding | Protruding | Protruding | - | - | - | - | - |
| | Protruding amount [mm] | 0.04 | 0.05 | - | - | - | - | - |
| Steering stability at high speeds | | 105 | 108 | 103 | 104 | 106 | 107 | 105 |
| Durability at high speeds when a camber is applied | | +1.0 | +2.0 | +0.75 | +0.75 | +2.0 | +2.0 | +1.5 |

FIG. 7B

PNEUMATIC TIRE

TECHNICAL FIELD

The present technology relates to a pneumatic tire and particularly relates to a pneumatic tire with enhanced steering stability at high speeds and enhanced durability at high speeds when a camber is applied.

BACKGROUND ART

Conventionally, pneumatic tires with an object of securing straight-line stability are known. For example, the pneumatic tire of Japanese Unexamined Patent Application Publication No. 2002-29216A comprises land portions defined by grooves that extend in a direction that intersects a tread width direction cross section in the tread portion. When viewed in a tread width direction cross section, the contact surface of the land portions is curved so as to protrude outward in the radial direction, and the apex of the contact surface closest to the profile line of the tread surface across the entire tread width is offset from the lateral center of the land portion toward one side edge of the land portion by from 0.1 to 0.4 times the width of the land portion.

Also, Japanese Unexamined Patent Application Publication No. 2004-122904A, for example, describes a pneumatic tire comprising a center land portion extending along the tire equator, an outer land portion extending in the shoulder portion, an intermediate land portion located between the center land portion and the outer land portion; these circumferential grooves defining a tread surface. Such a pneumatic tire when in a regular state of being mounted on a regular rim, inflated to a regular internal pressure, and having no load applied, when viewed in the tire meridian cross section including the tire axis, the radius of curvature R1 of the outer surface of the center land portion is greater than the radius of curvature R2 of the outer surface of the intermediate land portion, and the center of each radius of curvature R1, R2 lies at the same position.

In recent years, in line with increases in the performance of vehicles, pneumatic tires having both steering stability at high speeds and durability at high speeds when a camber is applied have been demanded. To cater to such a demand to ensure steering stability, a pneumatic tire such as that described in Japanese Unexamined Patent Application Publication No. 2002-29216A has been effective. The pneumatic tire of Japanese Unexamined Patent Application Publication No. 2002-29216A has a configuration in which a rib (land portion), formed in the tread portion, has a profile that, when viewed in the tire meridian cross section, protrudes outward in the tire radial direction more than the profile of the tread surface so that the rib has better contact with the ground. However, when a camber is applied to a vehicle, durability at high speeds tends to decrease. This is because, in the case of a negative camber, ribs located inward of the tire equator plane when the tire is mounted on a vehicle have a longer contact patch length than ribs located outward of the tire equatorial plane. Consequently, achieving both steering stability at high speeds and durability at high speeds when a camber is applied has been difficult.

The pneumatic tire described in Japanese Unexamined Patent Application Publication No. 2004-122904A is configured for enhanced durability. However, the pneumatic tire is for light trucks. Also, the pneumatic tire has a configuration in which, due to differences in the radius of curvature, a center land portion protrudes outward in the tire radial direction a great deal more than the intermediate land portion. Consequently, if the pneumatic tire was applied to a vehicle with a camber, durability of a center land portion would decrease and steering stability would also decrease.

SUMMARY

The technology provides a pneumatic tire with both steering stability at high speeds and durability at high speeds when a camber is applied.

The pneumatic tire of the present technology comprises at least three circumferential grooves extending in a tire circumferential direction in a tread portion, and at least four ribs defined by the circumferential grooves, the at least four ribs extending in the tire circumferential direction. At least two of the ribs protrude outward in a tire radial direction beyond a profile line of a tread surface when viewed in a meridian cross section. A protruding amount of the at least two ribs decreases in order from a first side in a tire width direction to a second side.

According to such a pneumatic tire, at least two of the ribs protrude beyond the profile line with the protruding amount decreasing in order from the first side to the second side. Consequently, when a negative camber is applied, by mounting the tire on a vehicle with the first side corresponding to the vehicle outer side and the second side corresponding to the vehicle inner side, or, alternatively when a positive camber is applied, by mounting the tire on a vehicle with the first side corresponding to the vehicle inner side and the second side corresponding to the vehicle outer side, better contact with the ground in the tire width direction is achieved. As a result, increases in steering stability at high speeds are possible. Moreover, when a negative camber is applied, by mounting the tire on a vehicle with the first side corresponding to the vehicle outer side and the second side corresponding to the vehicle inner side, or, alternatively when a positive camber is applied, by mounting the tire on a vehicle with the first side corresponding to the vehicle inner side and the second side corresponding to the vehicle outer side, excessive contact with the ground in the tire width direction is alleviated. As a result, the length of the footprint (the length in the tire circumferential direction of the region of the tread surface that comes into contact with the road surface) is uniformed between the ribs and increases in durability at high speeds when a camber is applied are possible. Consequently, both steering stability at high speeds and durability at high speeds when a camber is applied can be achieved.

Also, the pneumatic tire of the present technology may have a configuration in which the protruding amount from the profile line of the ribs is from 0.05 mm to 2.0 mm, both inclusive.

When the protruding amount of the ribs is less than 0.05 mm, the effects of better contact with the ground and uniformity of the footprint lengths are difficult to achieve due to the small protruding amount of the ribs. When the protruding amount of the ribs exceeds 2.0 mm, the effects of better contact with the ground and uniformity of the footprint lengths become difficult to achieve due to the large protruding amount of the ribs. However, when the protruding amount of the ribs is from 0.05 mm to 2.0 mm, both inclusive, the effects of both steering stability at high speeds and durability at high speeds when a camber is applied can be significantly achieved.

Also, the pneumatic tire of the present technology may have a configuration in which a vehicle inner/outer side orientation when mounted on a vehicle is designated, and the protruding amount of the ribs decreases in order from the vehicle outer side to the vehicle inner side.

According to such a pneumatic tire, in the case of high-speed traveling, a negative camber is preferably applied from the perspective of enhancing steering stability. When a negative camber is applied, a configuration in which the ribs have a protruding amount that decreases in order from the vehicle outer side to the vehicle inner side can significantly achieve the effects of better contact with the ground and uniformity of the footprint lengths. Consequently, both the effects of steering stability at high speeds and durability at high speeds when a camber is applied can be significantly achieved.

Also, the pneumatic tire of the present technology may have a configuration in which the ribs protruding beyond the profile line are provided adjacent to one another interposed by the circumferential groove, and a difference between the respective protruding amounts of the ribs adjacent to one another is from 0.1 mm to 0.8 mm, both inclusive.

When the difference between the respective protruding amounts of adjacent ribs is less than 0.1 mm, the effects of better contact with the ground and uniformity of the footprint lengths are difficult to achieve due to difference between the respective protruding amounts of the ribs being too small. When the difference between the protruding amounts of adjacent ribs exceeds 0.8 mm, the effects of better contact with the ground and uniformity of the footprint lengths are difficult to achieve due to the difference between the respective protruding amounts of the ribs being too great. However, when the difference between the protruding amounts of adjacent ribs is from 0.01 mm to 0.8 mm, both inclusive, the effects of both steering stability at high speeds and durability at high speeds when a camber is applied can be significantly achieved.

Also, the pneumatic tire of the present technology may have a configuration in which the ribs protruding beyond the profile line are each provided between the circumferential grooves.

The ribs protruding beyond the profile line, which are each provided between the circumferential grooves, are ribs provided inward in the tire width direction, excluding outermost ribs in the tire width direction. These inner ribs in the tire width direction protrude outward in the tire radial direction beyond the profile line, the protruding amount decreasing in order from the first side in the tire width direction to the second side. This configuration contributes greatly to achieving the effects of better contact with the ground and uniformity of the footprint lengths. Consequently, the effects of both steering stability at high speeds and durability at high speeds when a camber is applied can be significantly achieved.

The pneumatic tire according to the present technology can achieve both steering stability at high speeds and durability at high speeds when a camber is applied.

BRIEF DESCRIPTION OF DRAWINGS

FIGS. 6A-6B is a table showing results of performance testing of pneumatic tires according to examples of the present technology.

FIGS. 7A-7B is a table showing results of performance testing of pneumatic tires according to examples of the present technology.

DETAILED DESCRIPTION

Below, an embodiment of the present technology is described in detail on the basis of the drawings. Note that the present technology is not limited by the embodiment. Also, constituents of the embodiment include elements that are essentially identical or that could be easily substituted by a person skilled in the art. Furthermore, a plurality of modified examples described in the embodiment can be combined as desired within the scope of obviousness by a person skilled in the art.

Figure 1:
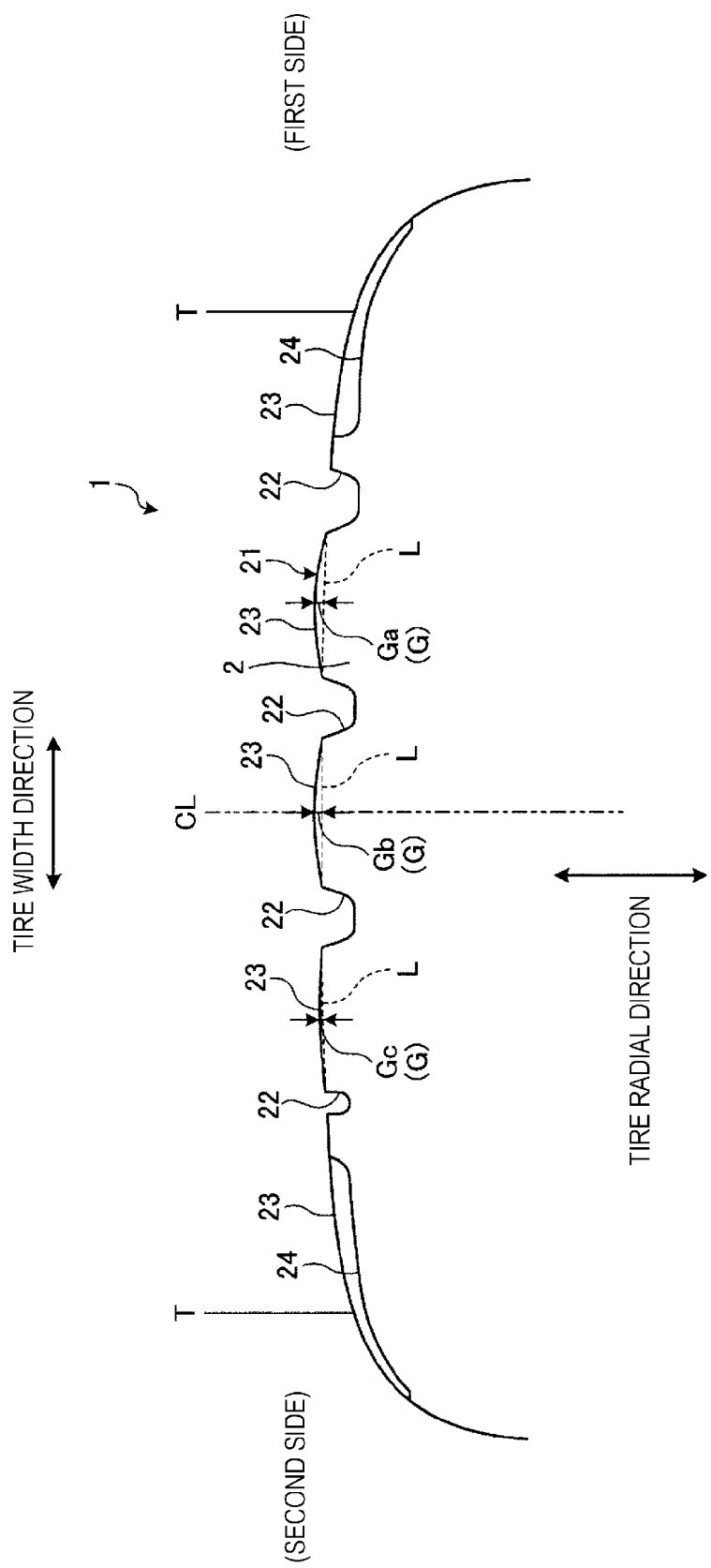
FIG. 1 is a meridian cross-sectional view of a tread portion of a pneumatic tire according to an embodiment of the present technology.
Figure 2:
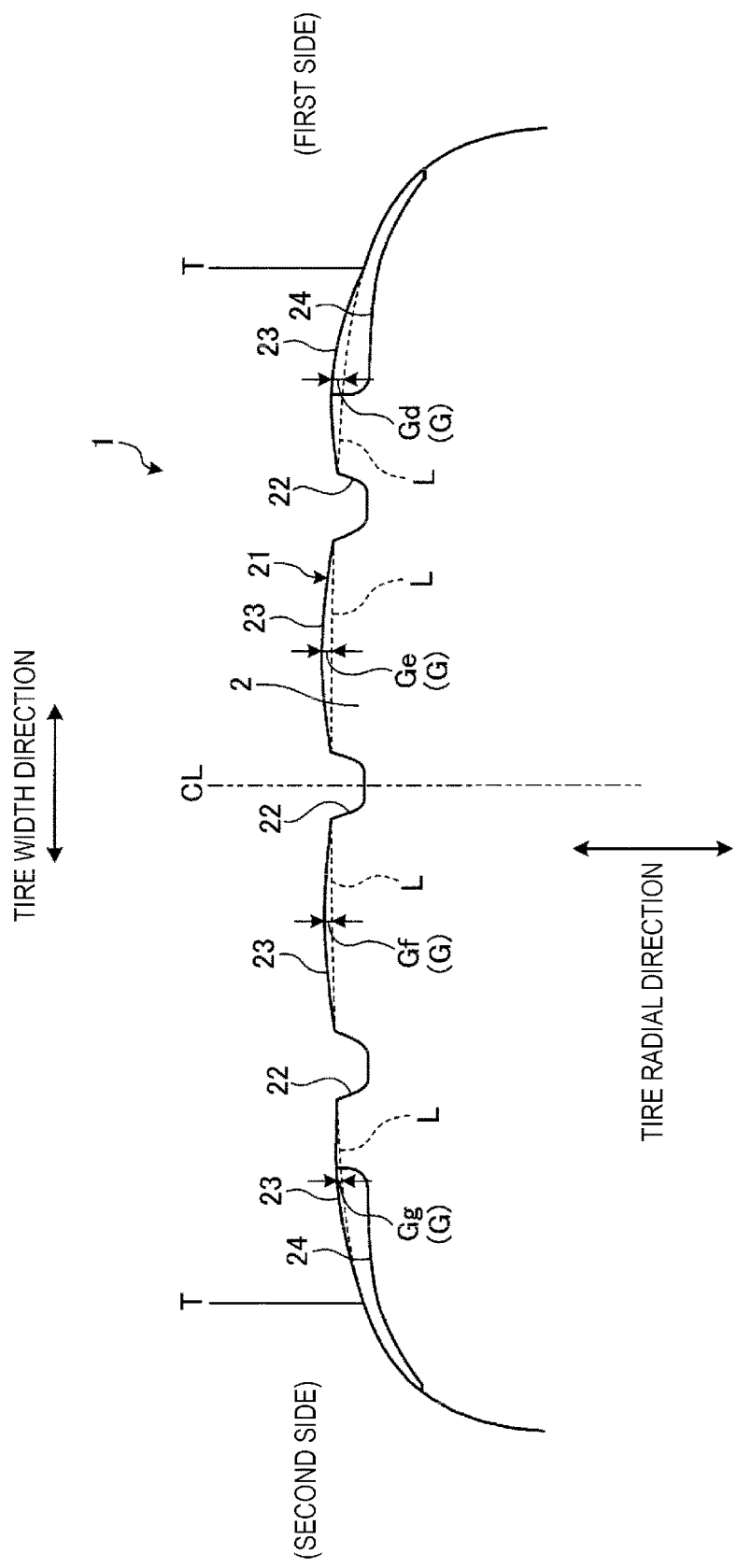
FIG. 2 is a meridian cross-sectional view of a tread portion of a pneumatic tire according to the embodiment of the present technology.
Figure 3:
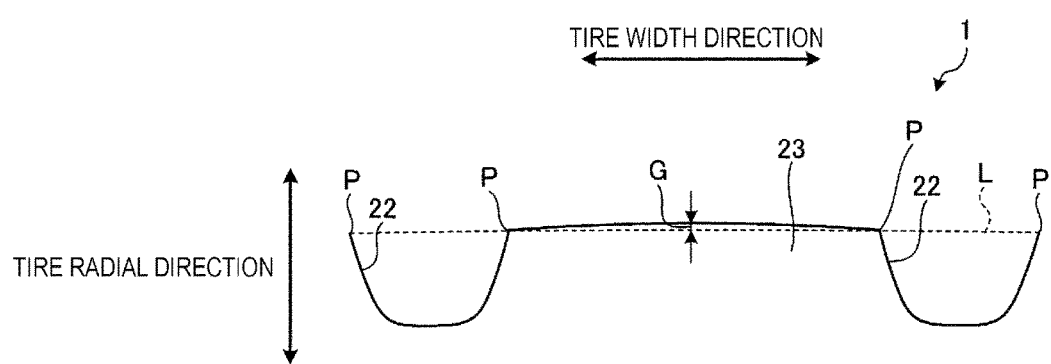
FIG. 3 is an enlarged meridian cross-sectional view of the tread portion of the pneumatic tire according to the embodiment of the present technology.
Figure 4:
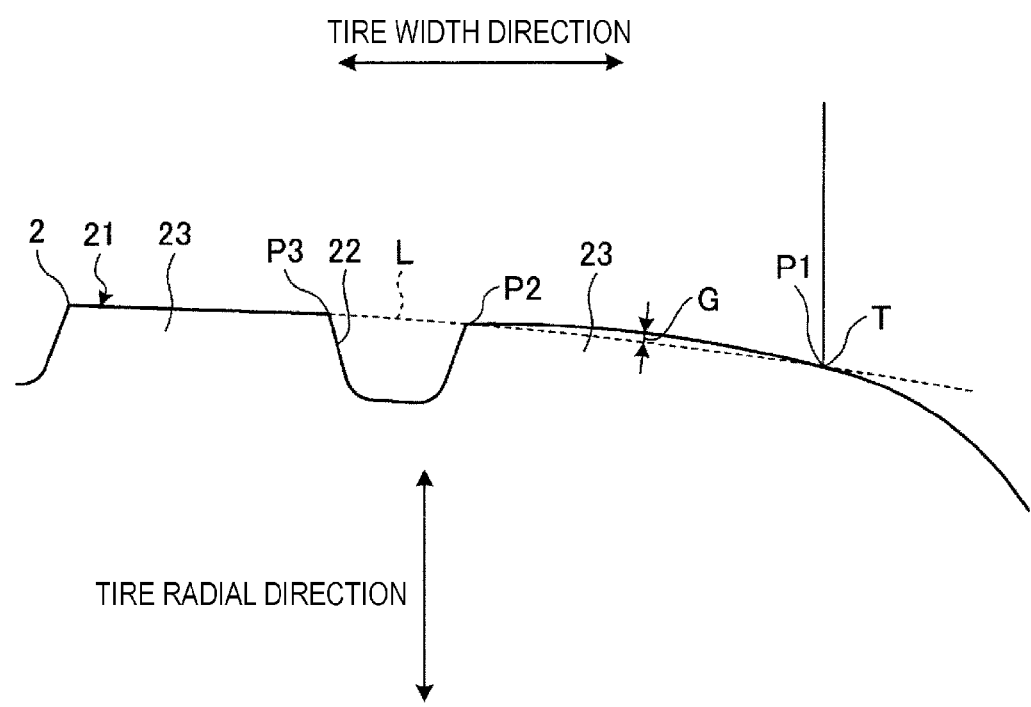
FIG. 4 is an enlarged meridian cross-sectional view of the tread portion of the pneumatic tire according to the embodiment of the present technology.
Figure 5:
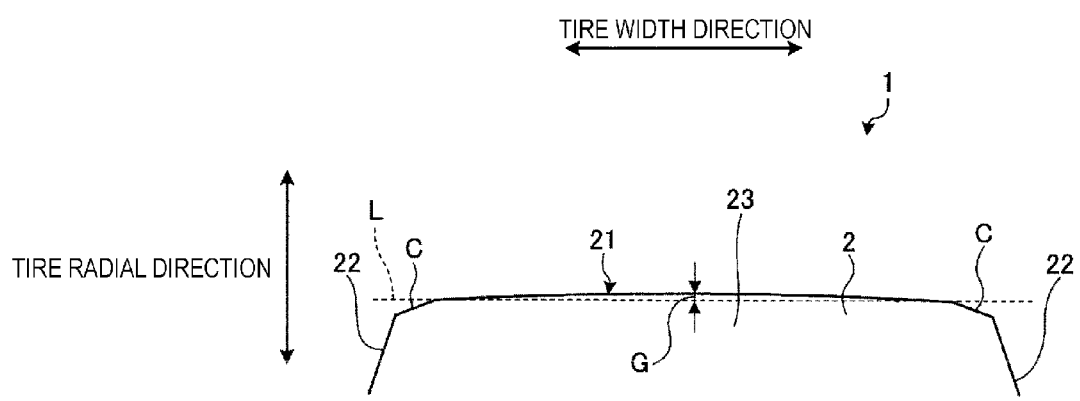
FIG. 5 is an enlarged meridian cross-sectional view of the tread portion of the pneumatic tire according to the embodiment of the present technology.

FIGS. 1 and 2 are meridian cross-sectional views of tread portions of pneumatic tires according to the present embodiment, and FIGS. 3 to 5 are enlarged meridian cross-sectional views of the tread portion of the pneumatic tire according to the present embodiment.

In the following description, "tire radial direction" refers to a direction orthogonal to the rotational axis (not illustrated) of the pneumatic tire 1. "Inward in the tire radial direction" refers to the side facing the rotational axis in the tire radial direction. "Outward in the tire radial direction" refers to the side distanced from the rotational axis in the tire radial direction. "Tire circumferential direction" refers to a circumferential direction around the rotational axis. "Tire width direction" refers to a direction parallel to the rotational axis. "Inward in the tire width direction" refers to a side facing a tire equator plane (tire equatorial line) CL in the tire width direction, and "outward in the tire width direction" refers to a side distanced from the tire equator plane CL in the tire width direction. The "tire equator plane CL" refers to a flat plane orthogonal to the rotational axis of the pneumatic tire 1 that extends in the center in the tire width direction of the pneumatic tire 1. "Tire width" refers to the width in the tire width direction between portions located outward in the tire width direction, or in other words, the distance between the most distant portions from the tire equatorial plane CL in the tire width direction. "Tire equatorial line" refers to a line on the tire equatorial plane CL that extends in the tire circumferential direction of the pneumatic tire 1. In the present embodiment, the tire equatorial line and the tire equatorial plane are both denoted by "CL".

In the pneumatic tire 1 of the present embodiment, a tread portion 2 is made from rubber material (tread rubber) and, as illustrated in FIGS. 1 and 2, is exposed most outwardly in the tire radial direction of the pneumatic tire 1, the surface of the tread portion 2 defining the profile of the pneumatic tire 1. A tread surface 21 is formed in the outer circumferential surface of the tread portion 2, in other words, the surface that comes contact with the road surface when travelling. The tread portion 2 is provided with a circumferential groove 22 that opens to the tread surface 21. The circumferential groove 22 has a groove depth from the tread surface 21 to the groove bottom of 5 mm or greater. A plurality of the circumferential grooves 22 (in FIG. 1, four, in FIG. 2, three) are provided in the tire width direction extending next to one another in the tire circumferential direction. Also, in the tread portion 2, a plurality of ribs 23 (in FIG. 1 five, in FIG. 2, four) are defined in the tire width direction by the plurality of circumferential grooves 22 and extend next to one another in the tire circumferential direction. In the ribs 23 of the tread portion 2, a plurality of lug grooves 24 are provided in the tire circumferential direction extending next to one another in a direction that intersects with the circumferential grooves 22. In FIGS. 1 and 2, the lug grooves 24 are only provided in the outermost ribs 23 in the tire width direction. However, lug grooves 24 may also be provided in other ribs 23. The lug grooves 24 may be configured to connect with the circumferential grooves 22, or may be configured to not connect with the circumferential grooves 22. When the lug grooves 24 are provided in the outermost ribs 23 in the tire width direction, the lug grooves 24 open outward in the tire width direction. Note that, as illustrated in FIG. 1, when the rib 23 is formed on the tire equatorial plane CL, even if a groove that extends in the tire circumferential direction with a groove depth of 5 mm or greater is formed in the rib 23 formed on the tire equatorial plane CL, the groove is not included as a circumferential groove 22.

Although not illustrated, the pneumatic tire 1 also comprises shoulder portions disposed connected to both outer side portions in the tire width direction of the tread portion 2; sidewall portions connected to the shoulder portions, the sidewall portions being exposed at the outermost positions in the tire width direction of the pneumatic tire 1; and bead portions connected to the sidewall portions, the bead portions engaging with the rim. Also, although not illustrated, bead cores are provided in the bead portions of the pneumatic tire 1. The bead cores are formed by winding bead wire (steel wire) in the tire circumferential direction to form a ring. The pneumatic tire 1 is also provided with a carcass layer that forms the skeleton of the tire. The carcass layer is configured by being folded over the pair of bead cores inside to outside in the tire width direction and stretched into a toroidal shape in the tire circumferential direction. Furthermore, the pneumatic tire 1 is provided with a belt layer. The belt layer is disposed outward (to the periphery) of the carcass layer in the tire radial direction in the tread portion 2 and has a multi-layer configuration in which at least two layers of belts are stacked upon one another.

When such a pneumatic tire 1 is new, as illustrated in FIGS. 1 and 2, at least two of the ribs 23 are formed protruding in the tire radial direction more outwardly than a profile line L of the tread surface 21. Also, the protruding amount G of the protruding ribs 23 decreases in order from the first side in the tire width direction to the second side in the tire width direction. In FIG. 1, an example is illustrated in which the outermost rib 23 in the tire width direction is formed to not protrude, the three ribs each provided between the circumferential grooves 22 are formed to protrude beyond the profile line L, and the relationship between the protruding amount G from the first side to the second side is such that Ga>Gb>Gc. Also, in FIG. 2, all (four) of the ribs 23 are formed to protrude beyond the profile line L, and the protruding amount G from the first side to the second side is such that Gd>Ge>Gf>Gg.

Note that the at least two ribs 23 that protrude beyond the profile line L may not be adjacent to each other interposed by the circumferential groove 22. Also, a rib 23 that does not protrude beyond the profile line L may be disposed in the tire width direction between the ribs 23 that protrude beyond the profile line L.

Here, "profile line L" refers to, in the case as illustrated in FIG. 3 of the rib 23 disposed between the circumferential grooves 22, a circular arc drawn at a maximum radius of curvature having a center inward of the tread surface 21 in the tire radial direction and passing through at least three opening edges P of four opening edges P of two adjacent circumferential grooves 22 located on either side of the rib 23 in the tire width direction when viewed in the meridian cross section.

Also, "profile line L" refers to, in the case as illustrated in FIG. 4 of the outermost rib 23 in the tire width direction, a circular arc drawn at a radius of curvature having a center inward of the tread surface 21 in the tire radial direction and passing through P1, P2, and P3; wherein P1 is a ground contact edge T of the outermost rib 23, P2 an opening edge on the outer side in the tire width direction of the circumferential groove 22 adjacent to the outermost rib 23, and P3 is an opening edge on the inner side in the tire width direction of the circumferential groove 22, when viewed in the meridian cross section.

Note that, as illustrated in FIG. 5, when a chamfer C is provided on the opening edge of the circumferential groove 22, the profile line L is defined as described above by taking the most outwardly positioned edge point in the tire radial direction as the opening edge. In FIG. 5, the illustrated rib 23 is disposed between the circumferential grooves 22, however the above holds for the outermost rib 23 in the tire width direction.

Additionally, the "ground contact edge T" refers to both outermost edges in the tire width direction of a region in which the tread surface 21 of the tread portion 2 of the pneumatic tire 1 comes into contact with the road surface when the pneumatic tire 1 is mounted on a regular rim, inflated to the regular internal pressure, and has the regular load applied thereto. The ground contact edge T continues in the tire circumferential direction.

Here, "regular rim" refers to a "standard rim" defined by the Japan Automobile Tyre Manufacturers Association Inc. (JATMA), "Design Rim" defined by the Tire and Rim Association, Inc. (TRA), or "Measuring Rim" defined by the European Tyre and Rim Technical Organisation (ETRTO). "Regular internal pressure" refers to "maximum air pressure" defined by JATMA, a maximum value in "tire load limits at various cold inflation pressures" defined by TRA, or "inflation pressures" defined by ETRTO. Also, "regular load" refers to "maximum load capacity" defined by JATMA, a maximum value in "tire load limits at various cold inflation pressures" defined by TRA, or "load capacity" defined by ETRTO.

In such a manner, the pneumatic tire 1 of the present embodiment comprises at least three circumferential grooves 22 extending in the tire circumferential direction in the tread portion 2, and at least four ribs 23 defined by the circumferential grooves 22 and extending in the tire circumferential direction. In such a pneumatic tire 1, at least two of the ribs 23 protrude outward in the tire radial direction beyond the profile line L of the tread surface when viewed in the meridian cross section. The protruding amount G of the protruding ribs 23 decreases in order from the first side in the tire width direction to the second side.

According to the pneumatic tire 1, at least two of the ribs 23 protrude beyond the profile line L with the protruding amount G decreasing in order from the first side to the second side. Consequently, when a negative camber is applied, by mounting the tire on a vehicle with the first side corresponding to the vehicle outer side and the second side corresponding to the vehicle inner side, or, alternatively when a positive camber is applied, by mounting the tire on a vehicle with the first side corresponding to the vehicle inner side and the second side corresponding to the vehicle outer side, better contact in the tire width direction is achieved. As a result, increases in steering stability at high speeds are possible. Moreover, when a negative camber is applied, by mounting the tire on a vehicle with the first side corresponding to the vehicle outer side and the second side corresponding to the vehicle inner side, or, alternatively when a positive camber is applied, by mounting the tire on a vehicle with the first side corresponding to the vehicle inner side and the second side corresponding to the vehicle outer side, excessive contact in the tire width direction is alleviated. As a result, the length of the footprint (the length in the tire circumferential direction of the region of the tread surface 21 that comes into contact with the road surface) is uniformed between the ribs 23 and increases in durability at high speeds when a camber is applied are possible. Consequently, both steering stability at high speeds and durability at high speeds when a camber is applied can be achieved.

In the pneumatic tire 1 of the present embodiment, the ribs 23 preferably have a protruding amount G of from 0.05 mm to 2.0 mm, both inclusive, from the profile line L.

When the protruding amount G of the ribs 23 is less than 0.05 mm, the effects of better contact with the ground and uniformity of the footprint lengths become difficult to achieve due to the small protruding amount G of the ribs 23. When the protruding amount G of the ribs 23 exceeds 2.0 mm, the effects of better contact with the ground and uniformity of the footprint lengths become difficult to achieve due to the large protruding amount G of the ribs 23. However, when the protruding amount G of the ribs 23 is from 0.05 mm to 2.0 mm, both inclusive, the effects of both steering stability at high speeds and durability at high speeds when a camber is applied can be significantly achieved. To achieve the effects of both steering stability at high speeds and durability at high speeds when a camber is applied to a more significant degree, the protruding amount G of the ribs 23 is preferably from 0.2 mm to 0.6 mm, both inclusive, from the profile line L.

Also, the pneumatic tire 1 of the present embodiment preferably has a designated vehicle inner/outer side orientation when mounted on a vehicle, and the ribs 23 preferably have a protruding amount G that decreases in order from the vehicle outer side to the vehicle inner side.

The vehicle inner/outer side orientation of such a pneumatic tire 1 may be designated by indicators provided on the sidewall portions, which indicate the vehicle inner/outer side orientation when the pneumatic tire 1 is mounted on a vehicle, for example. Note that the vehicle inner side and vehicle outer side designation is not limited to when the pneumatic tire 1 is mounted on a vehicle, and, for example, when the pneumatic tire 1 is mounted on a rim, the orientation of the rim may be designated with respect to the vehicle inner side and vehicle outer side in the tire width direction. As a result of this configuration, the pneumatic tire 1 is designated with a vehicle inner side and vehicle outer side orientation with respect to the tire width direction when mounted on a rim.

According to the pneumatic tire 1, in the case of high-speed traveling, a negative camber is preferably applied from the perspective of enhancing steering stability. When a negative camber is applied, a configuration in which the ribs 23 have a protruding amount G that decreases in order from the vehicle outer side to the vehicle inner side can significantly achieve the effects of better contact with the ground and uniformity of the footprint lengths. Consequently, both the effects of steering stability at high speeds and durability at high speeds with a negative camber is applied can be significantly achieved.

Also, in the pneumatic tire 1 of the present embodiment, the ribs 23 protruding beyond the profile line L are preferably provided adjacent to one another interposed by a circumferential groove 22, and the difference between the respective protruding amounts G of the adjacent ribs 23 is preferably from 0.1 mm to 0.8 mm, both inclusive.

When the difference between the respective protruding amounts G of adjacent ribs 23 is less than 0.1 mm, the effects of better contact with the ground and uniformity of the footprint lengths are difficult to achieve due to difference between the respective protruding amounts G of the ribs 23 being too small. When the difference between the respective protruding amounts G of adjacent ribs 23 exceeds 0.8 mm, the effects of better contact with the ground and uniformity of the footprint lengths are difficult to achieve due to the difference between the respective protruding amounts G of the ribs 23 being too great. However, when the difference between the respective protruding amounts G of adjacent ribs 23 is from 0.01 mm to 0.8 mm, both inclusive, the effects of both steering stability at high speeds and durability at high speeds when a camber is applied can be significantly achieved.

Also, in the pneumatic tire 1 of the present embodiment, the ribs 23 protruding beyond the profile line L are each preferably provided between circumferential grooves 22.

In other words, as illustrated in FIG. 1, the ribs 23 protruding beyond the profile line L, which are each provided between circumferential grooves 22, are ribs provided inward in the tire width direction, excluding outermost ribs 23 in the tire width direction (shoulder side ribs). These ribs 23 provided inward in the tire width direction protrude outward in the tire radial direction beyond the profile line L, and the protruding amount G decreasing in order from the first side in the tire width direction to the second side. This configuration contributes greatly to achieving the effects of better contact with the ground and uniformity of the footprint lengths. Consequently, the effects of both steering stability at high speeds and durability at high speeds when a camber is applied can be significantly achieved.

EXAMPLES

FIGS. 6 and 7 are tables showing results of performance testing of pneumatic tires according to the present examples. In the present examples, various types of pneumatic tires with different conditions were tested for performance relating to steering stability at high speeds (steering stability when travelling at high speeds), durability at high speeds when a camber is applied (durability when travelling at high speeds when a camber is applied), and the like.

In the tests, pneumatic tires of tire size 295/35R21 were used as the test tires.

The steering stability at high speeds was evaluated using the following method:

the above-described test tires were mounted on 21×10J rims, inflated to an air pressure of 260 kPa, then mounted on a test vehicle (passenger vehicle with an engine displacement of 4800 cc). Next, the test vehicle was driven on a test course with a dry road surface, and sensory evaluation was carried out by an experienced test driver regarding steering characteristics when changing lanes and cornering and stability when driving straight.

In the sensory evaluation, the results of the pneumatic tires are indicated by an index (100) based on the result of the pneumatic tire of the conventional example. A greater index value represents superior steering stability.

The durability at high speeds when a camber is applied was evaluated using the following method:

the above-described test tires were mounted on 21×10J rims and inflated to an air pressure of 340 kPa. A load of 7.65 kN was applied, and the test tires were mounted on a durability testing drum with a camber angle of −2.7 degrees (the first side corresponding to the vehicle outer side and the second side corresponding to the vehicle inner side when mounted on a vehicle), or a camber angle of +2.7 degrees (the first side corresponding to the vehicle inner side and the second side corresponding to the vehicle outer side when mounted on a vehicle) applied. The testing drum was ran while proceeding through the speed steps (described below), and the speed at which the test tire failed was measured. The pneumatic tires were evaluated based on how many steps above or below the pneumatic tire of the conventional example the test tire achieved. Here, +1 step means the test tire cleared running for 20 min at +10 km/h, and +0.5 step means the test tire cleared running for 10 min at +10 km/h.

Step 0: running time=0 min, speed=0 km/h
Step 1: running time=1 min, speed=0 to 190 km/h
Step 2: running time=5 min, speed=190 km/h
Step 3: running time=5 min, speed=240 km/h
Step 4: running time=10 min, speed=250 km/h
Step 5: running time=10 min, speed=260 km/h
Step 6: running time=10 min, speed=270 km/h
Step 7: running time=20 min, speed=280 km/h
Step 8: running time=20 min, speed=290 km/h
Step 9: running time=20 min, speed=300 km/h
Step 10: running time=20 min, speed=310 km/h Thereafter, speed was increased by +1 step (+10 km/h, running time of 20 min) until tire failure.

FIGS. 6A-6B shows rib configurations based on FIG. 1. Here, the outermost rib in the tire width direction corresponds to a first side outer rib, a rib adjacent to the first side outer rib inward in the tire width direction corresponds to a first side inner rib, a rib disposed on the tire equatorial plane adjacent to the first side inner rib inward in the tire width direction corresponds to a tire equatorial plane rib, a rib adjacent to the tire equatorial plane rib disposed on the second side corresponds to the second side inner rib, and the outermost rib adjacent to the second side inner rib outward in the tire width direction corresponds to a second side outer rib.

As shown in FIGS. 6A-6B, the pneumatic tire of Conventional Example 1 is provided with no protruding ribs. The pneumatic tire of Comparative Example 1 is provided with a protruding rib only on the tire equatorial plane. On the other hand, the pneumatic tires of Working Examples 1 to 15 shown in FIGS. 6A-6B have a configuration in which at least two ribs protrude outward in the tire radial direction beyond the profile line of the tread surface when viewed in the meridian cross section. The protruding amount decreases in order from the first side to the second side in the tire width direction. Also, the ribs of the pneumatic tires of Working Example 8, and Working Examples 10 to 15 have a protruding amount of from 0.05 mm to 2.0 mm, both inclusive. The difference between the respective protruding amounts of adjacent ribs of the pneumatic tires in the Working Example 11, and Working Examples 13 to 15 is from 0.1 mm to 0.8 mm, both inclusive. Furthermore, the pneumatic tires of Working Examples 1 to 3 and Working Examples 9 to 15 are provided with ribs protruding beyond the profile line, the ribs being each provided between circumferential grooves.

FIGS. 7A-7B shows rib configurations based on FIG. 2. Here, the outermost rib in the tire width direction corresponds to a first side outer rib, a rib adjacent to the first side outer rib inward in the tire width direction corresponds to a first side inner rib, a rib adjacent to the first side inner rib disposed on the second side corresponds to the second side inner rib, and the outermost rib adjacent to the second side inner rib outward in the tire width direction corresponds to a second side outer rib.

As shown in FIGS. 7A-7B, the pneumatic tire of Conventional Example 2 is provided with no protruding ribs. The pneumatic tire of Comparative Example 2 has a configuration in which only the first side inner rib protrudes. On the other hand, the pneumatic tires of Working Examples 16 to 27 shown in FIGS. 7A-7B have a configuration in which at least two ribs protrude outward in the tire radial direction beyond the profile line of the tread surface when viewed in the meridian cross section. The protruding amount decreases in order from the first side to the second side in the tire width direction. Also, the ribs of the pneumatic tires of Working Example 22, and Working Examples 24 to 27 have a protruding amount of from 0.05 mm to 2.0 mm, both inclusive. The difference between the respective protruding amounts of adjacent ribs of the pneumatic tires in Working Examples 25 to 27 is from 0.1 mm to 0.8 mm, both inclusive. Furthermore, the pneumatic tires of Working Example 16 and Working Examples 23 to 27 are provided with ribs protruding beyond the profile line, the ribs being each provided between circumferential grooves.

As is seen by the performance results shown in FIGS. 6A-6B and 7A-7B, the pneumatic tires of Working Examples 1 to 27 had enhanced steering stability at high speeds and durability at high speeds when a camber is applied.

The invention claimed is:

1. A pneumatic tire comprising:
at least three circumferential grooves extending in a tire circumferential direction in a tread portion; and
at least four ribs defined by the at least three circumferential grooves, the at least four ribs extending in the tire circumferential direction;
at least two ribs of the at least four ribs protruding outward in a tire radial direction beyond a profile line of a tread surface when viewed in a meridian cross section, the at least two ribs being provided adjacent to one another and interposed by one of the at least three circumferential grooves; and
a protruding amount of the at least two ribs decreasing in order from a first side to a second side in a tire width direction and a difference between a maximum value and a minimum value of respective protruding amounts of the at least two of the ribs being not less than 0.4 mm and not greater than 0.8 mm;
wherein the at least two ribs include a shoulder side rib defined as an outermost rib of the at least four ribs in the tire width direction.

2. The pneumatic tire according to claim 1, wherein the protruding amount from the profile line of the at least two ribs is from 0.05 mm to 2.0 mm, both inclusive.

3. The pneumatic tire according to claim 2, wherein
a vehicle inner/outer side orientation when mounted on a vehicle is designated, and
the protruding amount of the at least two ribs decreases in order from the vehicle outer side to the vehicle inner side.

4. The pneumatic tire according to claim 1, wherein
a vehicle inner/outer side orientation when mounted on a vehicle is designated, and
the protruding amount of the at least two ribs decreases in order from the vehicle outer side to the vehicle inner side.

5. The pneumatic tire according to claim 1, wherein at least three of the at least four ribs protrude beyond the profile line, and a difference between the respective protruding amounts of the at least three ribs is 0.3 mm to 0.8 mm, both inclusive.

6. The pneumatic tire according to claim 1, wherein each of the at least two ribs protrudes maximally at the center of the tire width direction when viewed in a meridian cross section.

7. A pneumatic tire comprising:
at least three circumferential grooves extending in a tire circumferential direction in a tread portion; and
at least four ribs defined by the at least three circumferential grooves, the at least four ribs extending in the tire circumferential direction;
at least three ribs of the at least four ribs, adjacent to one another, protruding outward in a tire radial direction beyond a profile line of a tread surface when viewed in a meridian cross section; and
a protruding amount of the at least three ribs decreasing in order from a first side to a second side in a tire width direction and a difference between the respective protruding amounts of the at least three ribs adjacent to one another is 0.3 mm to 0.8 mm, both inclusive;
wherein the at least three ribs include a shoulder side rib defined as an outermost rib of the at least four ribs in the tire width direction.

8. The pneumatic tire according to claim 7, wherein each of at least two of the at least three ribs are provided between the circumferential grooves and protrude maximally at the center of the tire width direction when viewed in a meridian cross section.

9. The pneumatic tire according to claim 7, wherein a protruding amount of the outermost rib of the at least three ribs in the first side of the tire width direction is a maximum protruding amount.

* * * * *